(12) United States Patent
Jaquet et al.

(10) Patent No.: US 12,157,283 B2
(45) Date of Patent: Dec. 3, 2024

(54) METHOD FOR DEPOSITING A COLORED LAYER ON A TIRE

(71) Applicant: COMPAGNIE GENERALE DES ETABLISSEMENTS MICHELIN, Clermont-Ferrand (FR)

(72) Inventors: Helene Jaquet, Clermont-Ferrand (FR); Walid Djabour, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 245 days.

(21) Appl. No.: 17/618,732

(22) PCT Filed: Jun. 11, 2020

(86) PCT No.: PCT/FR2020/050991
§ 371 (c)(1),
(2) Date: Dec. 13, 2021

(87) PCT Pub. No.: WO2020/249902
PCT Pub. Date: Dec. 17, 2020

(65) Prior Publication Data
US 2022/0363025 A1    Nov. 17, 2022

(30) Foreign Application Priority Data
Jun. 13, 2019 (FR) ........................... 1906277

(51) Int. Cl.
*B29D 30/72*    (2006.01)
*B60C 13/00*    (2006.01)
(Continued)

(52) U.S. Cl.
CPC ............ *B29D 30/72* (2013.01); *B60C 13/001* (2013.01); *B05D 1/26* (2013.01); *B05D 3/065* (2013.01);
(Continued)

(58) Field of Classification Search
CPC .............. B29D 30/72; B29D 2030/728; B60C 13/001; B05D 1/26; B05D 3/065; B05D 3/107; B05D 3/12; B05D 2530/00
(Continued)

(56) References Cited

U.S. PATENT DOCUMENTS 3,623,900 A * 11/1971 Stillwater et al. ..... B29D 30/72
427/386
4,700,078 A * 10/1987 Mizuno ................ G06K 7/1092
382/141
(Continued)

FOREIGN PATENT DOCUMENTS

CN    103740171 A    4/2014
DE    102017207921 A1    11/2018
(Continued)

OTHER PUBLICATIONS

International Search Report dated Sep. 18, 2020, in corresponding PCT/FR2020/050991 (4 pages).

*Primary Examiner* — Brian K Talbot
(74) *Attorney, Agent, or Firm* — VENABLE LLP

(57) ABSTRACT

A method for depositing at least one colored layer on the surface of a vulcanized tire sidewall includes applying by inkjet a colored layer to the whole of the sidewall or to at least a part of the sidewall of the tire and then, after drying, selectively removing the colored layer in such a manner as to create a first pattern. A tire obtained on completion of that method is also disclosed.

9 Claims, 3 Drawing Sheets

(51) Int. Cl.
*B05D 1/26* (2006.01)
*B05D 3/06* (2006.01)
*B05D 3/10* (2006.01)
*B05D 3/12* (2006.01)

(52) U.S. Cl.
CPC ............... *B05D 3/107* (2013.01); *B05D 3/12* (2013.01); *B05D 2530/00* (2013.01); *B29D 2030/728* (2013.01)

(58) Field of Classification Search
USPC ........................................................ 427/555
See application file for complete search history.

(56) References Cited

U.S. PATENT DOCUMENTS

| | | | | | |
|---|---|---|---|---|---|
| 4,778,060 | A * | 10/1988 | Wessner, Jr. | ........... | B07C 5/3412 209/3.3 |
| 4,941,522 | A * | 7/1990 | Sakurai | ................. | B60C 13/001 152/523 |
| 5,047,110 | A * | 9/1991 | Bryant | ................... | B29D 30/72 156/116 |
| 5,478,426 | A * | 12/1995 | Wiler | ........................ | B44B 7/00 219/121.72 |
| 5,527,407 | A * | 6/1996 | Gartland | ................ | G06K 1/126 156/277 |
| 5,834,530 | A * | 11/1998 | Ramcke | ................ | B60C 13/001 264/494 |
| 5,932,052 | A * | 8/1999 | Brown | ................... | B44C 1/1716 156/241 |
| 5,996,892 | A * | 12/1999 | Meadows | ........ | G06K 19/06018 235/487 |
| 6,093,271 | A * | 7/2000 | Majumdar | ............ | B60C 13/001 156/116 |
| 6,169,266 | B1 * | 1/2001 | Hughes | .................... | B41M 5/24 219/121.68 |
| 6,510,996 | B1 * | 1/2003 | Lee | ........................ | G06K 1/121 235/462.01 |
| 6,726,012 | B2 * | 4/2004 | Bielicki | ................ | B60C 13/001 40/587 |
| 9,039,139 | B2 * | 5/2015 | Ogawa | .................. | B60C 13/001 347/41 |
| 9,221,306 | B2 * | 12/2015 | Hajikano | ............... | B60C 13/001 |
| 2002/0089092 | A1 * | 7/2002 | Boissonnet | ........... | B60C 13/001 264/409 |
| 2012/0285598 | A1 | 11/2012 | Reuvekamp et al. | | |
| 2012/0301687 | A1 * | 11/2012 | Cotugno | ................. | C08J 7/042 427/258 |
| 2014/0022302 | A1 * | 1/2014 | Ogawa | ................... | B41J 3/4073 347/37 |
| 2014/0102620 | A1 * | 4/2014 | Cotugno | ............... | B60C 1/0025 427/265 |
| 2015/0165830 | A1 * | 6/2015 | Hajikano | .............. | B60C 13/001 347/20 |
| 2015/0246587 | A1 * | 9/2015 | Muhlhoff | ............. | B23K 26/384 152/523 |
| 2015/0367686 | A1 * | 12/2015 | Iwabuchi | .............. | B60C 13/001 152/523 |
| 2016/0001606 | A1 * | 1/2016 | Nakamura | ........... | B41M 5/0082 427/256 |
| 2017/0011666 | A1 | 1/2017 | Kraus | | |
| 2017/0050473 | A1 * | 2/2017 | Muhlhoff | ................ | B60C 13/02 |
| 2017/0157995 | A1 * | 6/2017 | Muhlhoff | .................. | B44C 1/00 |
| 2017/0213117 | A1 * | 7/2017 | Kraus | ................... | B60C 13/001 |
| 2017/0308749 | A1 * | 10/2017 | Tanno | ................. | B60C 11/0008 |
| 2018/0009275 | A1 * | 1/2018 | Iwabuchi | .............. | B60C 13/001 |
| 2018/0015872 | A1 * | 1/2018 | Huang | .................. | B60C 13/001 |
| 2018/0326780 | A1 * | 11/2018 | Yang | ...................... | B60C 13/001 |
| 2019/0061419 | A1 * | 2/2019 | Oh | ............................. | B60B 1/02 |
| 2020/0070597 | A1 * | 3/2020 | Noel | ................... | B60C 23/0493 |
| 2021/0129597 | A1 * | 5/2021 | Iwabuchi | .............. | B60C 13/001 |
| 2021/0268843 | A1 * | 9/2021 | Shinzawa | ................. | C08L 7/00 |
| 2022/0048266 | A1 * | 2/2022 | Muhlhoff | ............... | B29D 30/72 |
| 2023/0058763 | A1 * | 2/2023 | Zdunic, III | .......... | B23K 26/362 |

FOREIGN PATENT DOCUMENTS

| | | |
|---|---|---|
| EP | 2522496 A2 | 11/2012 |
| EP | 2905125 A1 | 8/2015 |
| EP | 3381669 A1 | 10/2018 |

\* cited by examiner

METHOD FOR DEPOSITING A COLORED LAYER ON A TIRE

BACKGROUND

The invention concerns a method for depositing at least one coloured layer on the surface of a tyre, and a tyre obtained in accordance with that method.

A tyre is a structure in the shape of a torus the revolution axis of which is the rotation axis of the tyre, comprising a tread intended to come into contact with the ground, two sidewalls and two beads intended to come into contact with a rim, the two beads being connected to the tread by the two sidewalls.

In the application CN103740171A, it is known to deposit paint on a tyre and then to vulcanize it by ultraviolet light. Unfortunately a method of this kind necessitates the use of paint containing volatile solvents.

There is also known from the document EP2,522,496 A1 a method for applying a strip of coloured rubber to the surface of the sidewall of the tyre and then curing the combination to obtain protuberances at the level of the covered strip of rubber. However, a method of this kind necessitates the use of a non-vulcanized tyre and has the disadvantage of comprising a large number of different production steps.

Also there remains the need for a method that enables a tyre to be obtained enabling it to be identified and to be visually marked both with the aim of harmonizing the tyre with the colour of the bodywork of the vehicle and to facilitate the identification of a fleet of vehicles equipped with such tyres.

SUMMARY

The invention therefore has for object a method for treating the surface of a vulcanized tyre sidewall. That method is characterized in that it consists in applying by inkjet a coloured layer to the whole of said sidewall or to at least a part of the sidewall of said tyre and then, after drying, selectively removing the coloured layer in such a manner as to create a first pattern.

The method according to the invention has the advantage of being simple to implement in particular through a small number of steps and of enabling very fine and regular application of the coloured layer. Another advantage of this method is to enable the production of different contrasts on the sidewalls, thus enabling widening of the possibilities for application of this type of coating. A final advantage of the method is that of applying a coloured layer that may be a colour identical to or different from that of the bodywork of the vehicle.

Another object of the invention is a tyre obtained by means of the method as described above.

DETAILED DESCRIPTION

The coloured layer preferably comprises at least one colour.

The coloured layer is preferably removed to a depth between 100% and 150% inclusive of the thickness of said coloured layer over at least a part of said sidewall.

The coloured layer is preferably removed by chemical means and/or by mechanical abrasion and/or by laser.

A second pattern is preferably created contrasting with said first pattern on said sidewall, said second pattern comprising a structure able to trap light or micro-orifices or micro-striations.

Said second pattern in micro-orifice form preferably comprises a plurality of openings and intermediate zones separating those openings, the openings occupying at least 60% of the pattern, those openings being distributed in said second pattern in accordance with a density at least equal to five openings per $mm^2$, those openings having equivalent diameters between 0.03 mm and 0.5 mm inclusive.

Said second pattern in micro-striation form preferably comprises a plurality of substantially parallel blades disposed at a pitch of at most 0.5 mm, each blade having an average width between 0.03 mm and 0.05 mm inclusive.

The micro-orifices and the micro-striations preferably each have walls at least a quarter of the surface whereof has a mean roughness between 5 μm and 30 μm inclusive.

Preferably, the second pattern is obtained by laser and/or by machining and/or by chemical means.

The second pattern is preferably disposed in said first pattern or in the vicinity of said first pattern.

BRIEF DESCRIPTION OF THE DRAWINGS

The invention will now be described with the aid of the following figures which are diagrammatic and not necessarily to scale, and in which:

In FIG. 1 can be seen a partially represented tyre of general reference 1 comprising a tread 2 intended to come into contact with the ground, two sidewalls 3 and two beads 4 intended to come into contact with a rim, the two beads 4 being connected to the tread 2 by the two sidewalls 3.

FIG. 2A shows a tyre in accordance with the invention of which a part of the sidewall 3 has received the application of a coloured layer 5. Prior to the application of the coloured layer, the sidewall 3 of the tyre is cleaned and degreased, and then heated to approximately 90° with the aid of an infra-red lamp. The coloured layer 5 is a water-based ink and is applied with the aid of a rotary machine including inkjet nozzles. The nozzles move in translation during printing while the tyre is rotated. Just after the application of the ink to the sidewall 3 of the tyre, the ink is dried by an infra-red lamp. The tyre is then cooled, after which a laser beam at a rated power between 15 and 20 W inclusive is applied to this covered surface to remove the ink in a predefined manner to create a first pattern 6 as shown in FIG. 2B. The ink is modified to a depth of approximately 120% over all the area of the sidewall 3 bearing the ink.

FIG. 3 shows a first pattern 6 including a second pattern 7. This second pattern 7 includes a plurality of substantially parallel blades disposed at a pitch of at most 0.5 mm, each blade having a mean width of approximately 0.04 mm. This pattern 7 gives an impression similar to that of velvet.

Figure 1:
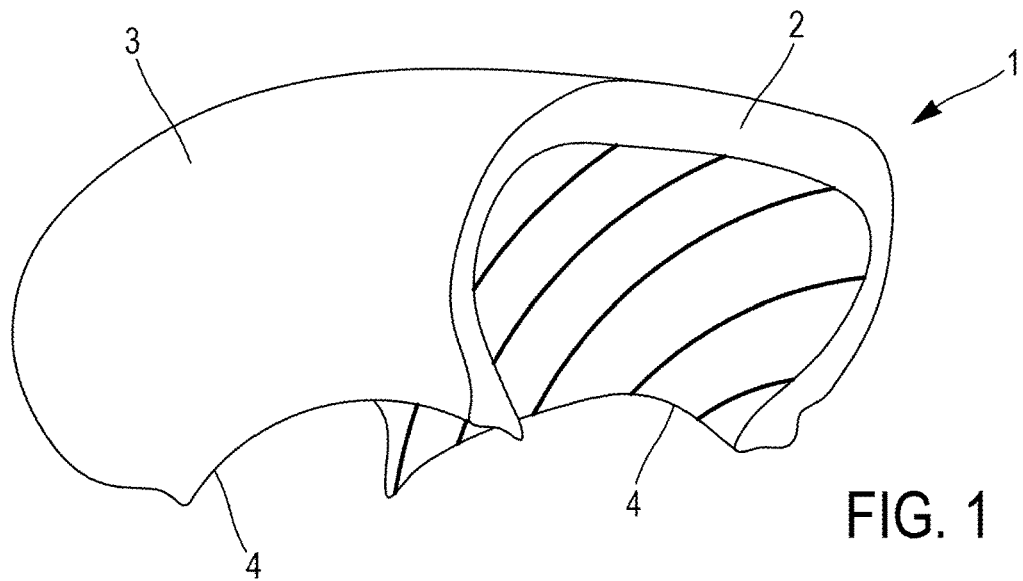
FIG. 1 represents a diagrammatic partial view of a prior art tyre.
Figure 2A:
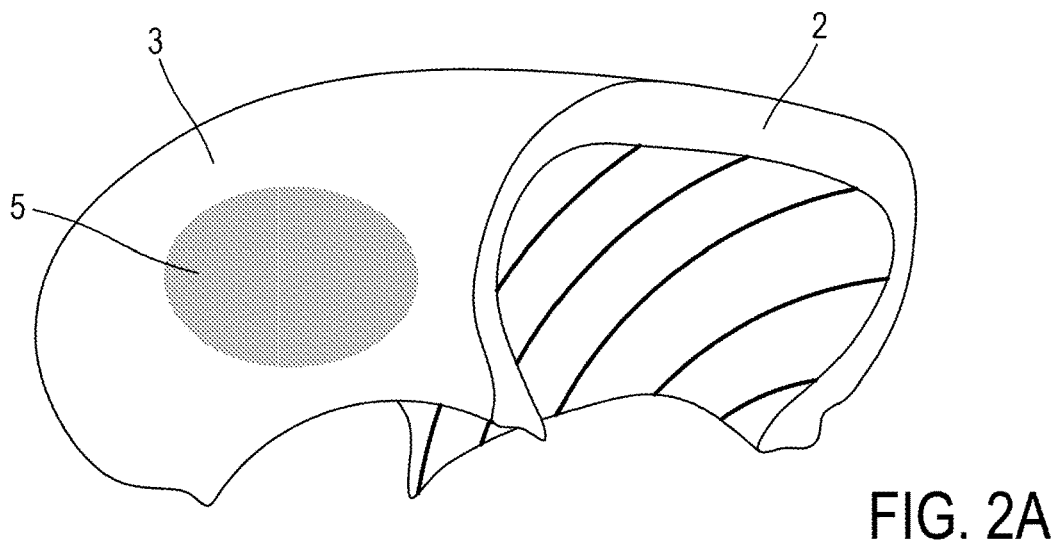
FIGS. 2A and 2B represent a diagrammatic partial view of a tyre obtained in accordance with the invention.
Figure 2B:
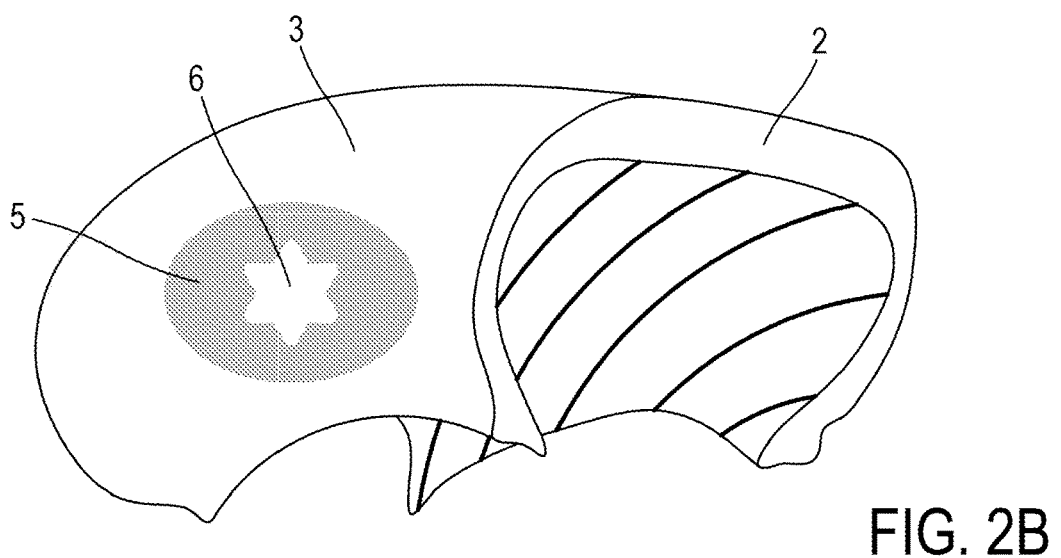
Figure 3:
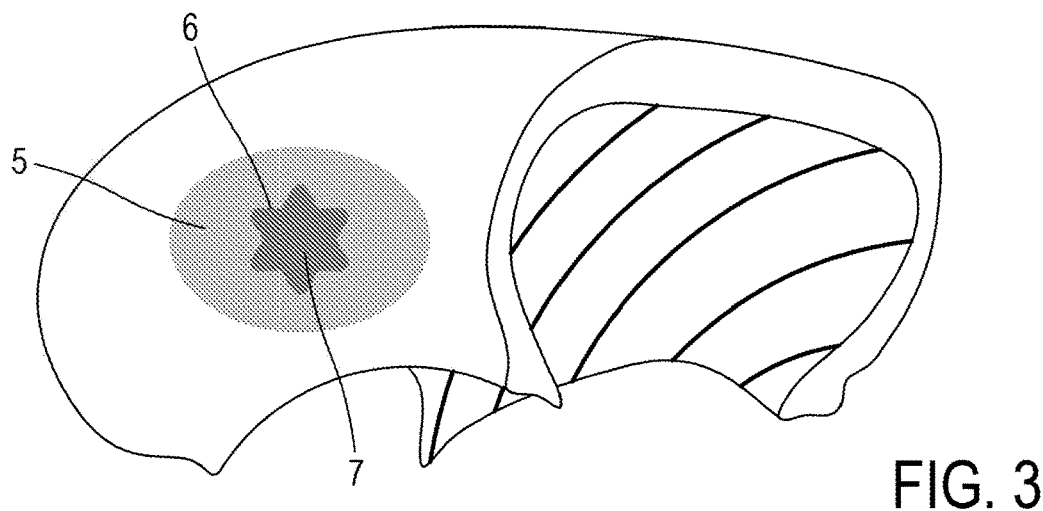
FIG. 3 represents a diagrammatic partial view of a tyre obtained in accordance with a first variant of the invention.
Figure 4:
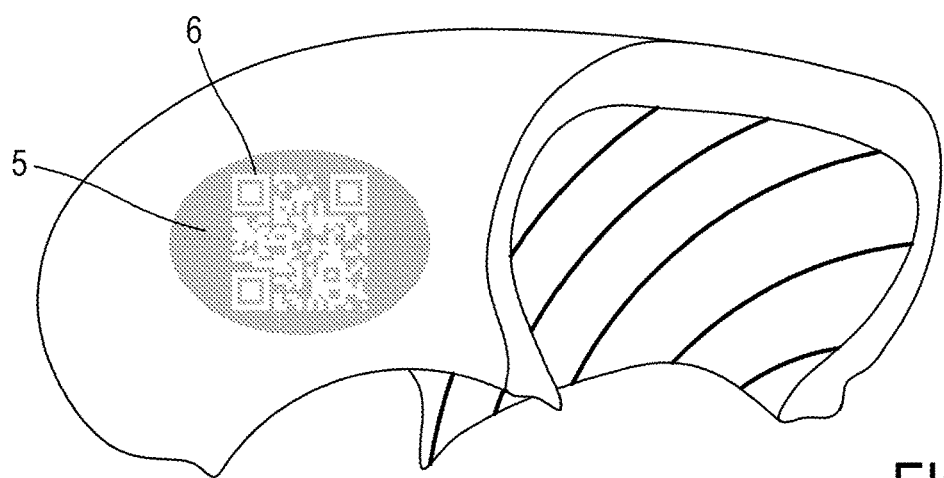
FIG. 4 represents a diagrammatic partial view of a tyre obtained in accordance with a second variant of the invention.
Figure 5:
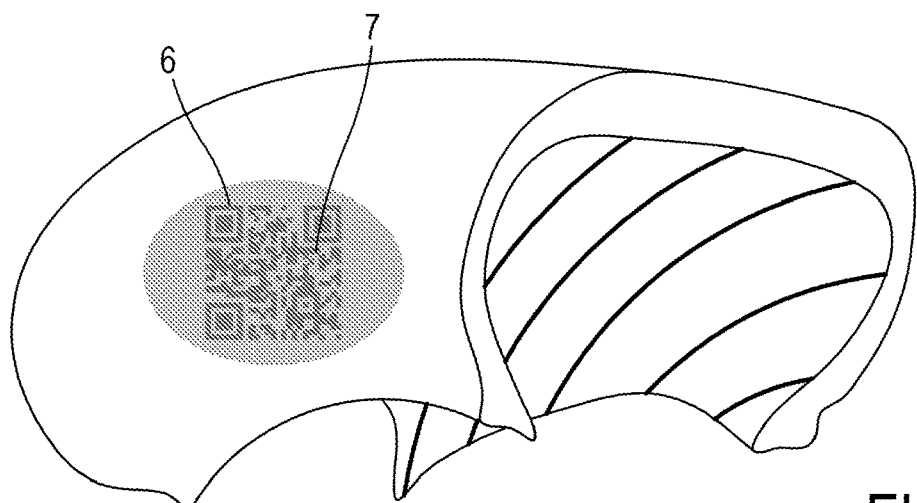
FIG. 5 represents a diagrammatic partial view of a tyre obtained in accordance with a third variant of the invention.

As FIG. 4 shows, the first pattern 6 may take the form of a QR code enabling the storage of information. It is obtained by the clearly defined removal of the coloured layer. FIG. 5 shows the design of a QR code from FIG. 4 to which is added a second pattern 7 consisting of micro-striations with a density equal to six openings per mm$^2$, the openings having equivalent diameters equal to 0.04 mm giving this impression of velvet.

Figure 6A:
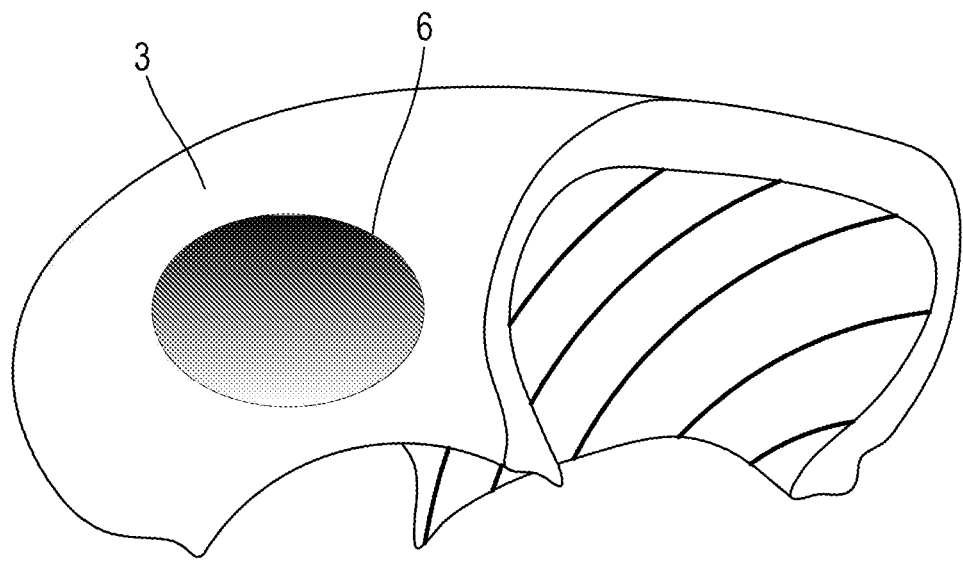
FIGS. 6A and 6B represents a diagrammatic partial view of a tyre obtained in accordance with a fourth variant of the invention.
Figure 6B:
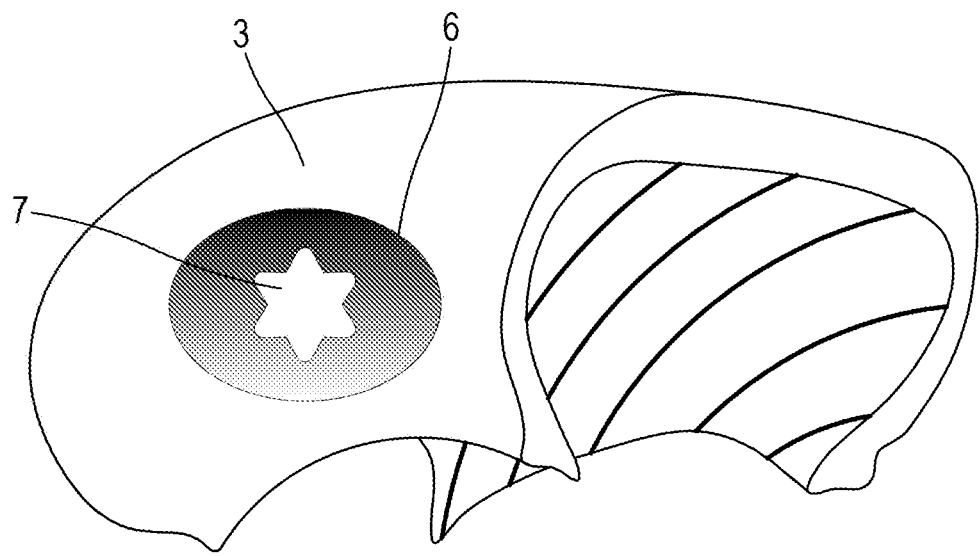

FIGS. 6A and 6B each show a variant of the first pattern obtained in accordance with the invention that comprises a first pattern 6 and a second pattern 7, both multicoloured, comprising different colours of ink able to represent a gradation of colours.

The invention claimed is:

1. A method for treating a surface of a vulcanized tire sidewall comprising:
   heating the sidewall to approximately 90°;
   applying by inkjet a colored layer to a whole of the vulcanized tire sidewall or to at least a part of the vulcanized tire sidewall; and
   then, after drying, selectively removing the colored layer in such a manner as to create a first pattern.

2. The method according to claim 1, wherein the colored layer comprises at least one color.

3. The method according to claim 1, wherein the colored layer is removed to a depth between 100% and 150% inclusive of a thickness of the colored layer over at least a part of the vulcanized tire sidewall.

4. The method according to claim 3, wherein the colored layer is removed by a manner selected from the group consisting of chemical means, mechanical abrasion, laser, and any combination thereof.

5. The method according to claim 1, wherein a second pattern is created contrasting with the first pattern on the vulcanized tire sidewall, the second pattern comprising a structure able to trap light or micro-orifices or micro-striations.

6. The method according to claim 5, wherein the second pattern comprises micro-orifices comprising a plurality of openings and intermediate zones separating the openings, the openings occupying at least 60% of the second pattern, being distributed in the second pattern in accordance with a density at least equal to five openings per mm$^2$, and having equivalent diameters between 0.03 mm and 0.5 mm inclusive.

7. The method according to claim 5, wherein the second pattern comprises micro-striations comprising a plurality of substantially parallel blades disposed at a pitch of at most 0.5 mm, each blade having an average width between 0.03 mm and 0.05 mm inclusive.

8. The method according to claim 5, wherein the second pattern is obtained by a manner selected from the group consisting of laser, mechanical abrasion, chemical means and any combination thereof.

9. The method according to claim 5, wherein the second pattern is disposed in the first pattern or in a vicinity of the first pattern.

* * * * *